INVENTORS,
LEONARD J. GENEST
ARNOLD I. KLAYMAN
BY M. Jabin
ATTORNEY

INVENTORS,
LEONARD J. GENEST
ARNOLD I. KLAYMAN
BY M. Jabin
ATTORNEY

United States Patent Office 3,559,067
Patented Jan. 26, 1971

3,559,067

MULTILEVEL WEIGHTED CARRIER ENCODED DIGITAL DATA TRANSMISSION SYSTEM

Leonard J. Genest and Arnold I. Klayman, Marina del Rey, Calif., assignors to Octronix, Inc., a California corporation Filed Dec. 14, 1967, Ser. No. 690,564
Int. Cl. H04l *3/00;* H04b *1/68;* H03k *13/04*
U.S. Cl. 325—38 3 Claims

ABSTRACT OF THE DISCLOSURE

A data transmission system is disclosed for enabling a standard telephone channel to carry higher-than-normal pulse data rates. A data compressor is disclosed for converting two-level high-speed data into multilevel lower-speed data which can be handled by existing telephone communication lines. A data expander is disclosed for subsequently reconverting the multilevel low-speed data back into two-level high-speed data which is the same as the original data.

BACKGROUND OF THE INVENTION

When a telephone channel is to be utilized in data transmission, it is first necessary to process the raw data by some form of modulation scheme. The reason for this is that data usually consists of a stream of pulses which may or may not occur at a regular rate. These pulses can be in the form of changes in level or contact closures and are usually binary in nature, or in "on" or "off" conditions. Since the telephone lines cannot recognize or transmit D.C. levels, it is necessary to modulate a carrier in some way (such as A.M., F.M., S.S.B., or vestigial side band) with the pulsed information, so that the phone line can handle the information.

Since the typical phone line is band limited to about 3000 cycles on the high end, it is difficult to use carrier frequencies higher than 2500 cycles reliably. Under ideal conditions, a carrier at this frequency can be modulated up to 2400 cycles and the modulation still be recovered, using vestigial side band modulation. The device that performs this form of modulation is normally referred to as a "modem" (modulator-demodulator). Thus, the standard telephone channel is ordinarily capable of carrying a data stream of 2000 bits per second, and under ideal conditions 2400 bits per second.

SUMMARY OF THE INVENTION

According to the preferred embodiment of the present invention, two-level high-speed data is converted into multilevel lower-speed data by a data compressor, transmitted as such over a standard telephone communication line, and then reconverted by a data expander back into the original two-level high-speed data.

The data compressor takes the data input and synchronizes it, serially distributes it to a plurality of storage means such as flip-flops, sums the outputs of the storage means in a manner such that the outputs of the storage means are weighted in a binary code before being summed, evaluates the output of the summing means by sampling means and the result is stored in a memory. A carrier derived from the synchronizing means is modulated by the coded data output of the memory.

The data expander performs the inverse function of the compressor after the coded modulated data is transmitted over the telephone line.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
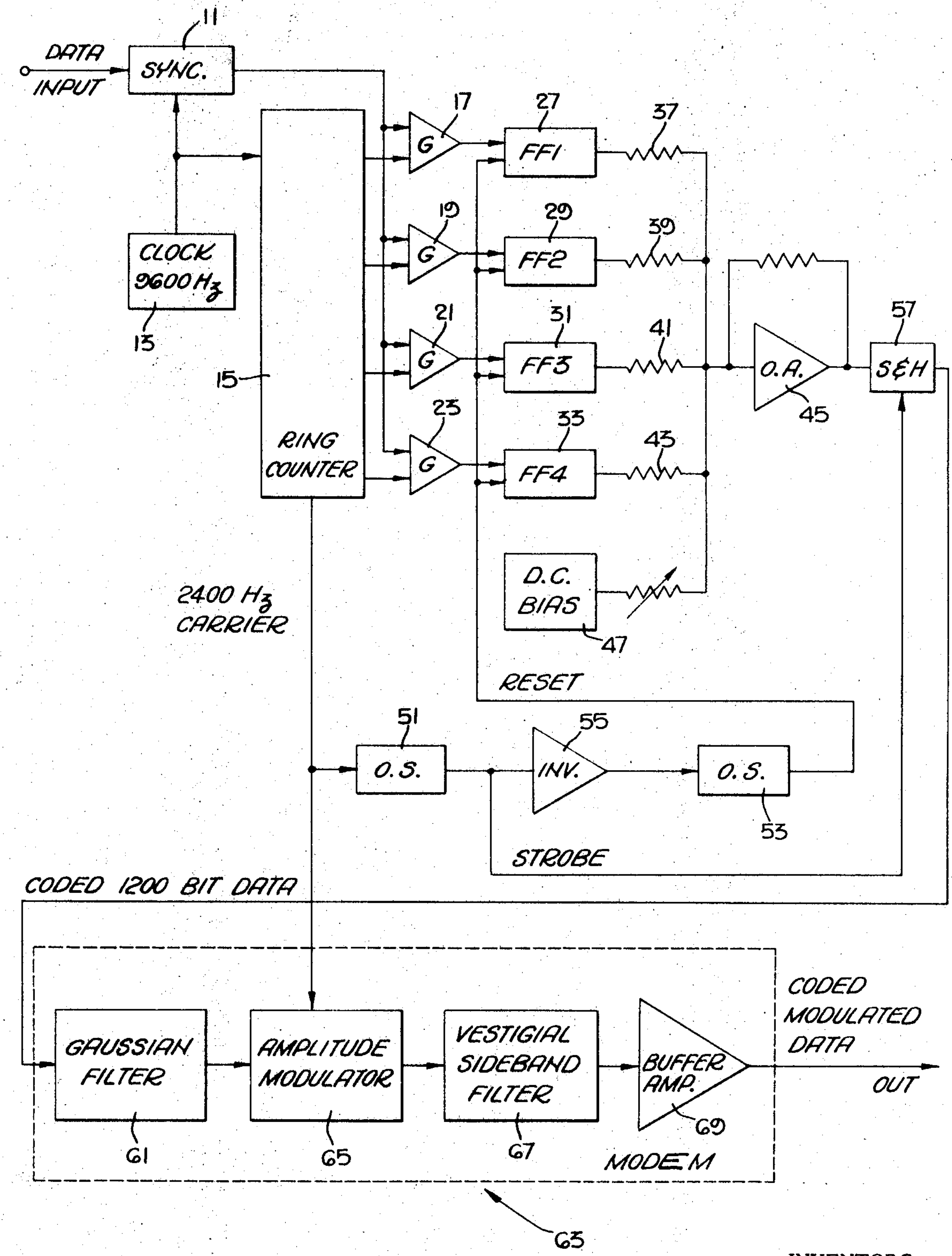
FIG. 1 is a block diagram of a data compressor according to the present invention.

Turning now to the drawings, FIG. 1 shows the data input being supplied to synchronizer 11. By way of example only, it will be assumed that the high-rate data to be encoded is 9600 bits per second and that it is to be sent over a phone line using a modem operating at a carrier frequency of 2400 Hz., or cycles per second.

This is basically accomplished by synchronizing the raw, high-speed data with a reference clock 13 operating at 9600 Hz. and connected to synchronizer 11 and scale-of-four ring counter 15. The output of synchronizer 11 is supplied to gates 17, 19, 21 and 23, which are sequentially enabled by ring counter 15. The outputs of gates 17, 19, 21 and 23 are connected to flip-flops 27, 29, 31 and 33, respectively, and distribute synchronized data bits to the proper flip-flop at the proper time, as determined by the position of the ring counter 15.

The clocked data is serially distributed to the four flip-flops in the following manner, assuming that each flip-flop is a binary bistable multivibrator in its reset conditions:

(a) Data bit No. 1 goes to FF1
(b) Data bit No. 2 goes to FF2
(c) Data bit No. 3 goes to FF3
(d) Data bit No. 4 goes to FF4

If any of these data bits is a "one," the corresponding flip-flop is set. If any data bit is a "zero," the corresponding flip-flop is left on reset.

The output of flip-flop 27 (FF1) is connected to resistor 37, the output of flip-flop 29 (FF2) is connected to resistor 39, the output of flip-flop 31 (FF3) is connected to resistor 41, and the output of flip-flop 33 (FF4) is connected to resistor 43. The resistance of resistor 39 is twice the resistance of resistor 37, the resistance of resistor 41 is twice the resistance of resistor 39, and the resistance of resistor 43 is twice the resistance of resistor 41.

The outputs of the four flip-flops are then summed in the operational amplifier 45 and are weighted in a binary code. The output of the operational amplifier 45, therefore, can assume any one of sixteen levels between 0 and 15, depending on the states of the flip-flops. A D.C. bias 47 can be summed into the amplifier 45 to preclude a zero voltage ouput.

The ring counter 15 is also connected to one shot 51, the output of which is connected to one shot 53 through inverter 55. One shot 51 generates the strobe pulse to enable, or turn on, sample and hold memory 57, which serves as an analog gate with a memory. One shot 53 generates the reset pulse for the flip-flops 27, 29, 31 and 33. The output of the operational amplifier 45 is sampled every fourth pulse and the result is stored in sample and hold memory 57. The flip-flops are then reset, and the process is repeated.

Each level that is produced is representative of the unique combination of the four pulses which produced it, and since the changes in level are occurring at the rate of one-fourth of the 9600 bit data-pulse, rate, or 2400 level changes per second, a data compression by encoding is achieved. The two-level high-speed data has been converted to multilevel lower-speed data. An exchange has been effected between the data rate and the number of levels of data to better match the data to the capabilities of the telephone line.

Since phone lines have primarily been used for speech or analog signal transmission, the telephone system is well adapted to carry multilevel information. The new data rate of 2400 level shifts per second corresponds to a frequency of 1200 Hz. (two levels per cycle or alternation). A modem with the carrier frequency at 2400 Hz. can easily be modulated with this form of encoded data.

Thus, the code 1200 bit data output of sample and hold memory 57 is supplied to gaussian filter 61 of modem 63. Amplitude modulator 65 of modem 63 receives inputs from gaussian filter 61 and the 2400 Hz. carrier from ring counter 15. Vestigial sideband filter 67 of modem 63 receives the output from the amplitude modulator 65. Buffer amplifier 69 of modem 63 receives the output of filter 67, and the output of buffer amplifier 69 is the desired coded modulated data.

Although a vestigial sideband form of modem has been described, other well known types of modulation could be used. Some of the various waveforms present in the described data compression system will now be delineated.

Figure 2:
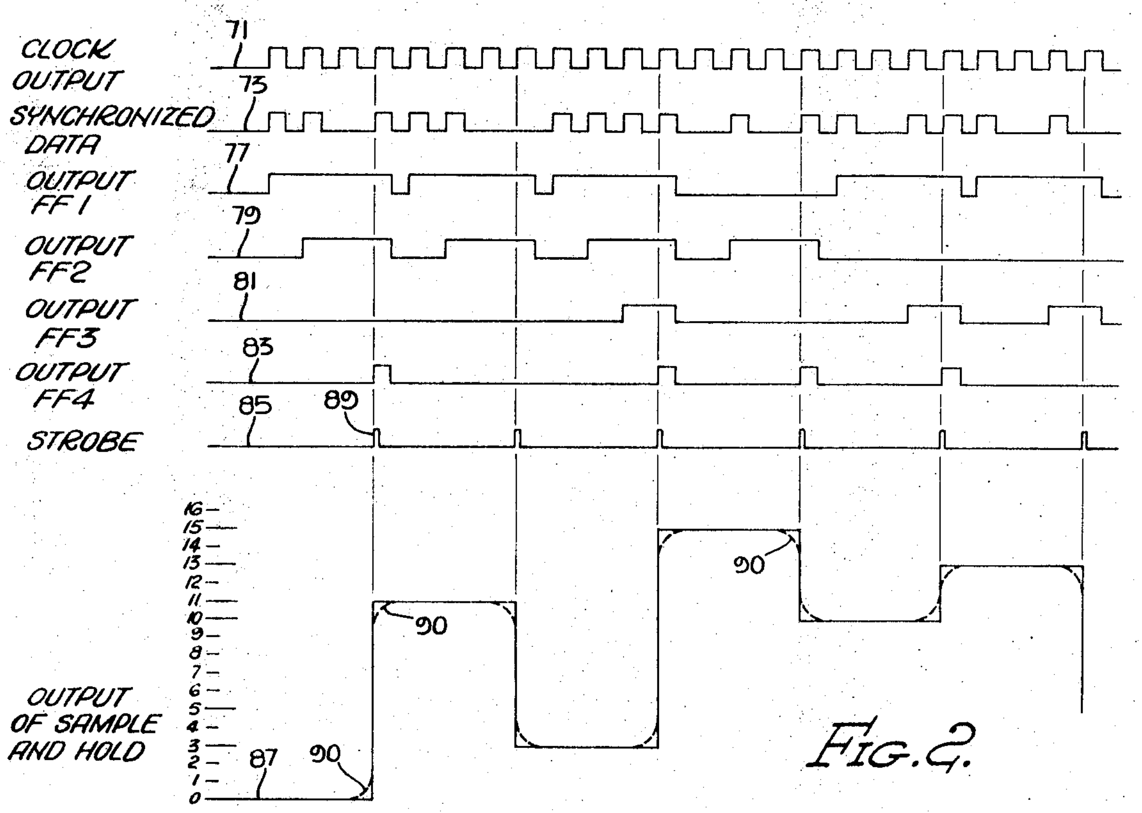
FIG. 2 shows the waveforms present at various locations of the block diagram of FIG. 1.

FIG. 2 shows waveform 71 representing the output of 9600 bit clock 13. Waveform 73 represents the synchronized 9600 bit data input, and waveforms 77, 79, 81 and 83 represent the serialized outputs of flip-flops 27, 29, 31 and 33, respectively. Waveform 85 shows the strobe pulses generated by one shot 51 on every fourth clock pulse to enable sample and hold memory 57.

Waveform 87 represents the coded 1200 bit data output of sample and hold memory 57 and shows the described 16 levels. The level of waveform 87 at each strobe pulse equals the sum of the outputs of flip-flops 27, 29, 31 and 33, with the outputs of flip-flops 27, 29, 31 and 33 being weighted 1:2:4:8, respectively. Thus, the level of waveform 87 for strobe pulse 89 equals 1+2+0+8, or 11. As can be seen, the speed of 16-level waveform 87 is only one-fourth that of the two-level data input. Waveform 90 shows the change in shape of the coded data when it becomes the output of gaussian filter 61.

Figure 3:
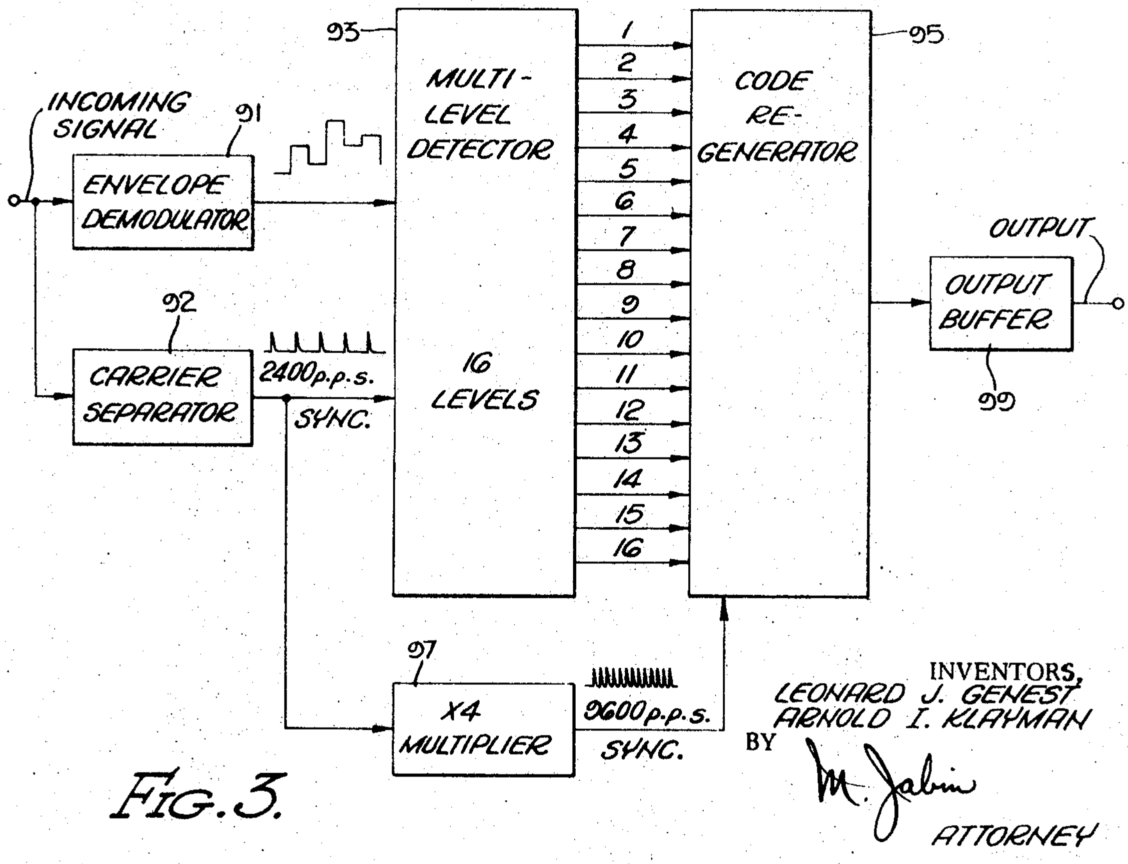
FIG. 3 is a block diagram of a data expander according to the present invention.

FIG. 3 shows the data expander used to reconstruct the compressed data after it has travelled over the telephone communications link.

The incoming signal is first demodulated by the envelope demodulator 91 of the appropriate type depending on the type of modulation chosen in the compressor. The demodulation yields the compressed, multilevel information. The carrier is also extracted from the incoming signal by the carrier separator 92, to be used for synchronization purposes. The compressed, multilevel information is then fed, along with the synchronizing signal, to the 16 level detector 93. The purpose of this multilevel detector 93 is to energize one of sixteen discrete outputs, depending on the instantaneous level of the input during a given synchronization interval. For any one of sixteen discrete input levels, therefore, the level detector 93 will energize one of sixteen discrete output lines. The sixteen output lines are fed to the code regenerator 95. The code regenerator 95 also has connected to it a 9600 pulses per second (p.p.s.) sync which has been derived from the original 2400 cycle carrier by means of the time 4 (×4) multiplier 97.

The code regenerator 95 is capable of generating sixteen unique code bursts at 9600 p.p.s. having four mark-space intervals per burst. Since the code bursts are in groups of four mark-space intervals, there can be no more than sixteen unique code bursts of binary information. Each code burst is produced by energizing one of the input lines coming from the level detector 93. Each discrete level, therefore, produces a unique code burst which is identical with that code burst which produced that level in the compressor.

In the preceding discussion on the compressor it was noted that each level produced is representative of the unique combination of four pulses which produced it. Now it can be seen that the expander has conversely reproduced the unique combination of mark-space intervals representative of a particular level. The multilevel low-speed (compressed) data, therefore, has been re-converted to binary or two-level high-speed data which is exactly the same as the original data. This information is now fed to a suitable output buffer 99 so that the information can be used for the desired purpose, be it as a computer, card punch, Teletype, facsimile or the like.

We claim:

1. A data transmission system comprising data compressor means for converting two-level high-speed data into more than two-level lower-speed data suitable for transmission over a communications link; and data expander means for converting the transmitted multilevel lower-speed data back into the original two-level high-speed data, the combination of said data compressor and expander means including:

(a) means for synchronizing the data input to said system;

(b) means including a ring counter for serially distributing the synchronized data to a plurality of storage means including a plurality of flip-flop circuits;

(c) means coupled to said storage means for weighting the outputs thereof in a binary code;

(d) means for summing the weighted outputs of said storage means;

(e) means coupled to said summing means for sampling the output thereof and storing the result in memory means;

(f) means coupled to said storage means for the resetting thereof;

(g) means coupled to said memory means for modulating a carrier by the coded data output of said memory means, said carrier being derived from said synchronizing means, and the coded modulated data being suitable for transmission over a communications link;

(h) means for demodulating the envelope of the transmitted data;

(i) means for separating the carrier from the coded modulated data;

(j) means coupled to the outputs of said envelope demodulator means and said carrier separator means for detecting more than two levels;

(k) means for code regeneration coupled to the output of the multilevel detector means; and (l) means for multiplying and coupling the output of said carrier separator means to the code regenerator means.

2. A data transmission system according to claim 1 in which said means coupled to said memory means for modulating a carrier by the coded data output of said memory means includes a modem.

3. A data transmission system according to claim 2 in which said storage means includes four flip-flops; in which the weighted outputs of said storage means are weighted in the ratio of 1:2:4:8; in which said multilevel detector is capable of energizing any one of sixteen discrete outputs; in which said code regenerator is capable of generating sixteen unique code bursts; and in which said multiplier means includes a times-four multiplier.

References Cited

UNITED STATES PATENTS

| | | | |
|---|---|---|---|
| 3,196,352 | 7/1965 | Hopner et al. | 325—38[A] |
| 3,229,209 | 1/1966 | Critchlow et al. | 325—50 |
| 3,337,691 | 8/1967 | Litchman | 179—15[A] |
| 3,369,229 | 2/1968 | Dorros | 325—38 |
| 3,401,341 | 9/1968 | Kahn | 325—316 |

ROBERT L. GRIFFIN, Primary Examiner

J. A. BRODSKY, Assistant Examiner

U.S. Cl. X.R.

179—15.55